No. 3,953.
REISSUED MAY 3, 1870.
B. S. ROBERTS.
BREECH LOADING FIREARM.
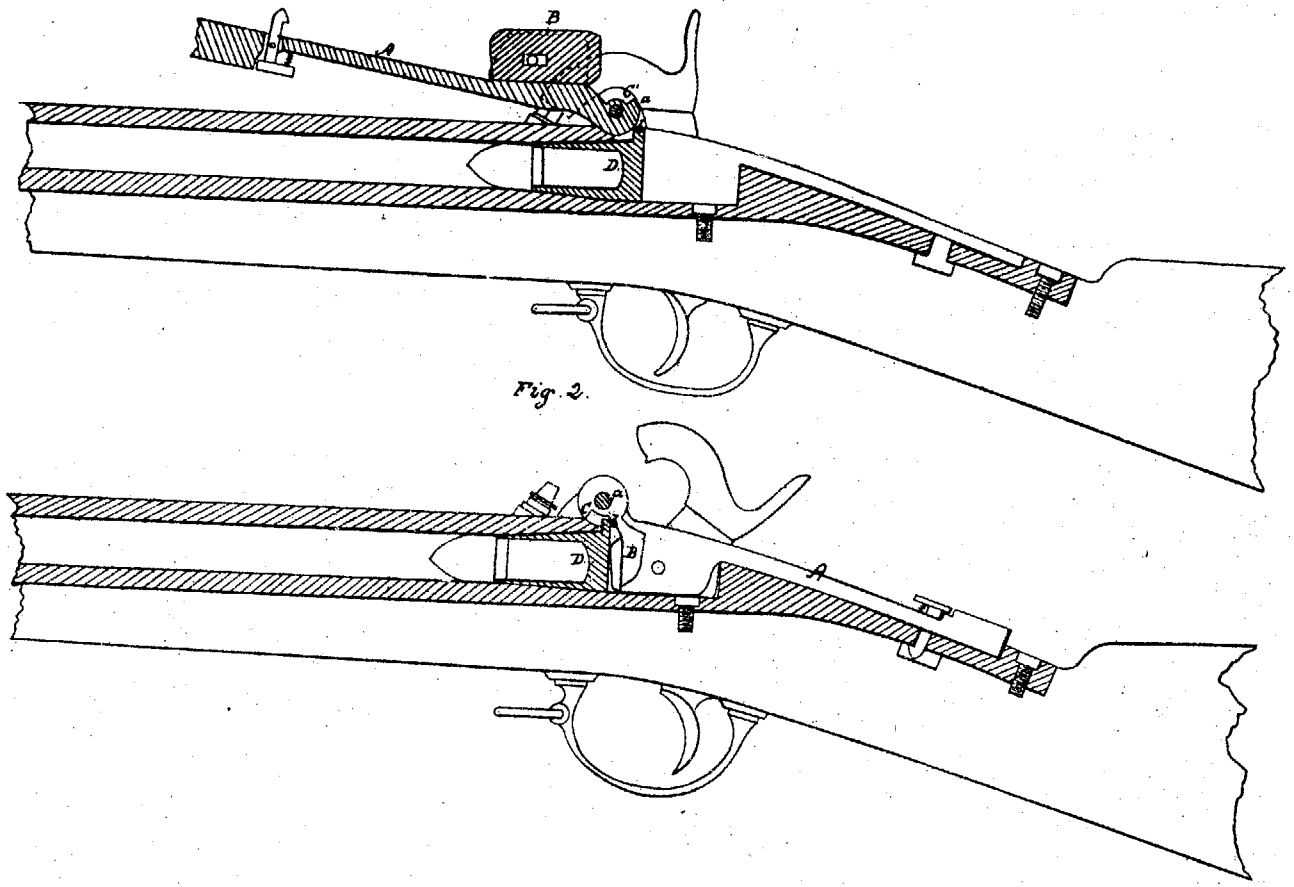
Witnesses:
R. Thompson
John Schaffer
Inventor.
B. S. Roberts

UNITED STATES PATENT OFFICE.

BENJAMIN S. ROBERTS, OF THE UNITED STATES ARMY.

IMPROVEMENT IN BREECH-LOADING FIRE-ARMS.

Specification forming part of Letters Patent No. 36,531, dated September 23, 1862; Reissue No. 2,068, dated September 5, 1865; Reissue No. 3,953, dated May 3, 1870.

*To all whom it may concern:*

Be it known that I, BENJAMIN S. ROBERTS, of the United States Army, have invented a new and useful Improvement in Breech-Loading Fire-Arms; and I do hereby declare that the following is a full and exact description thereof, reference being had to the accompanying drawings, in which—

Figure 1 is a longitudinal sectional view of a breech-loading fire-arm embodying my invention as it appears when the gun is open, preparatory to loading, and having a cartridge entered in the barrel. Fig. 2 is a similar view of the same arm loaded and having the breech closed. Fig. 3 is a cross-section of the movable breech-block.

My invention relates to that class of breech-loading fire-arms in which the breech is closed by a movable breech-piece that is pivoted to the rear end of the barrel, and swings backward and downward in closing the gun and upward and forward in opening it.

It consists in so constructing and arranging a swinging breech-piece that by permitting it to have combined with its rotary motion a slight radial motion, or a motion on lines parallel to the radial, it will close down at the rear of the breech of the barrel into and fill the space provided for it between the breech of the barrel and the recoil-shoulder in its rear when such recoil-shoulder is perpendicular to the axis of the bore of the barrel, thus obviating all tendency to throw the breech-plug up and out of its place by the explosion of the cartridge in the gun.

A is the barrel, open at the breech. B is a hinged lever pivoted firmly to the barrel at O, and arranged to swing upward and forward in the act of opening the gun, and backward and downward in closing it. To this lever is connected a movable breech-plug, C, having a groove, *h*, on the under side fitted into a rib, D, on the lever, and fastened to the rib by a pin, *d*, that passes through a hole in the rib and a slotted hole in the plug C. The groove is not cut longitudinally entirely through the plug, leaving the front end solid, to cover the breech of the barrel. A recoil-shoulder, *e*, is made in the frame or housing of the gun, or in the portion of the barrel extending in the rear of the plug. This recoil-shoulder is perpendicular to the axis of the bore, and the plug is made to fit into and fill the space between the breech of the barrel and the recoil-shoulder, the rear end of the plug being also, of course, perpendicular to the axis of the bore when the gun is closed. Now, it is evident that this breech-plug could not swing into its place in closing the breech if it were fixed rigidly to the lever B, and were permitted to move only on a curve about the pivot O, as in moving into the space between the open breech of the barrel and the recoil-shoulder *e* it must move in a direction perpendicular to the axis of the bore of the barrel; but by permitting it to have a slight radial motion, or a motion parallel to a radial, it is enabled to depart from the curvilinear to a right line perpendicular to the axis of the bore in the act of closing into the said space. By the combined curvilinear and right-line motion of the breech-plug the convenience of a rotary movement of it in opening and closing the breech is secured at the same time that there are secured the strength and safety of a recoil-shoulder, that is perpendicular to the axis of the barrel against which the breech-plug squarely abuts and completely closes the breech.

I do not intend to confine myself to the precise mechanism above described. Other modes of constructing and arranging the breech-plug and connecting it with the barrel will readily suggest themselves to a person skilled in the art of gun-making. The essential conditions are that the breech-plug shall be so arranged as to permit it to have curvilinear motion about an axis and a right-line motion tangential to such curve, substantially as described.

What I claim as my invention, and desire to secure by Letters Patent, is—

The combination and arrangement of the within-described parts or their equivalents, by means of which the swinging breech-plug, consisting of the lever B and sliding breech-plug C, in opening and closing the breech shall have the combined rotary and right-line motion, as above described, permitting it while swinging on its axis to close down on a recoil-shoulder that is perpendicular, or nearly so, to the axis of the bore of the barrel and fill the space between such shoulder and the barrel of the gun, substantially as specified.

B. S. ROBERTS.

Witnesses:

L. SPERRY,

S. S. PIERPONT.